United States Patent Office 2,786,836
Patented Mar. 26, 1957

2,786,836
COMPOUNDS FOR SYNTHESIZING STEROIDS

Martin W. Farrar, Webster Groves, Harold Raffelson, St. Louis, and William S. Knowles, Kirkwood, Mo., assignors to Monsanto Chemical Company, St. Louis, Mo., a corporation of Delaware No Drawing. Original application June 15, 1953, Serial No. 361,828. Divided and this application October 31, 1955, Serial No. 544,048

2 Claims. (Cl. 260—239.55)

This invention relates to methods and novel steroidal compounds of the cyclopentanodimethylpolyhydrophenanthrene series having a 3-keto group, an 11-keto group and a double bond in the 4, 5 position, which compounds are intermediates in proceeding from a 17-formyl-cyclopent-16 - eno - 10,13 - dimethyl - Δ⁴ - dodecahydrophenanthrene-3,11-dione to a 17-(acyloxyacetyl)-17-hydroxy cyclopentano - 10,13 - dimethyl - Δ⁴ - dodecahydrophenanthrene-3,11-dione by a process hereinafter described. In particular this invention relates to methods and novel compounds useful in the preparation of acyl derivatives of 3,11,20 - triketo - 17,21 - dihydroxy - Δ⁴ - pregnene from 3,11-diketo-17-formyl-Δ⁴,¹⁶-androstadiene.

This invention will be described with respect to its preferred embodiment but it is to be understood that such is not limitative of this invention.

The sequence of steps or series of reactions proceeding to a 17-(acyloxyacetyl)-17-hydroxy-cyclopentano-10,13-dimethyl-Δ⁴-dodecahydrophenanthrene-3,11-dione for purposes of this invention is outlined schematically in the following diagram proceeding from a 17-formyl-cyclopent - 16 - eno - 10,13 - dimethyl - Δ⁴ - dodecahydrophenanthren-3,11-dione.

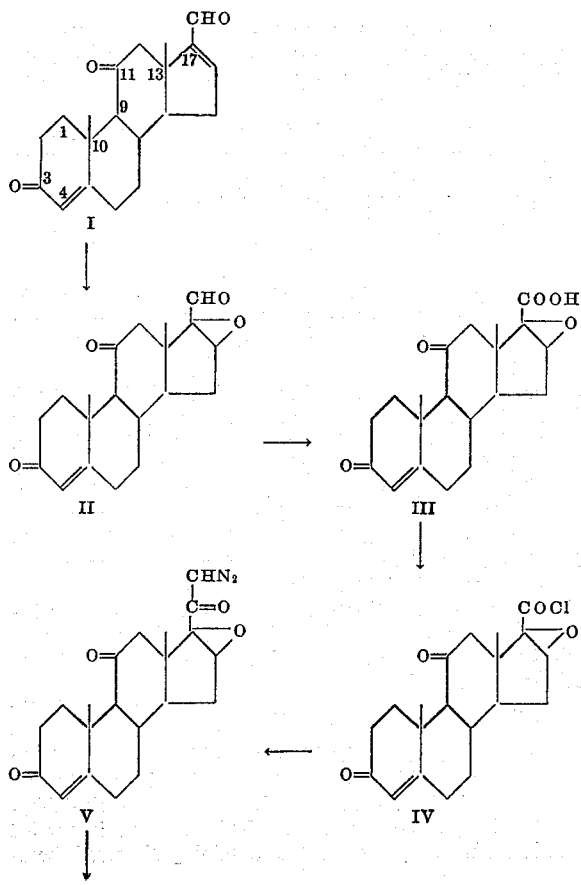

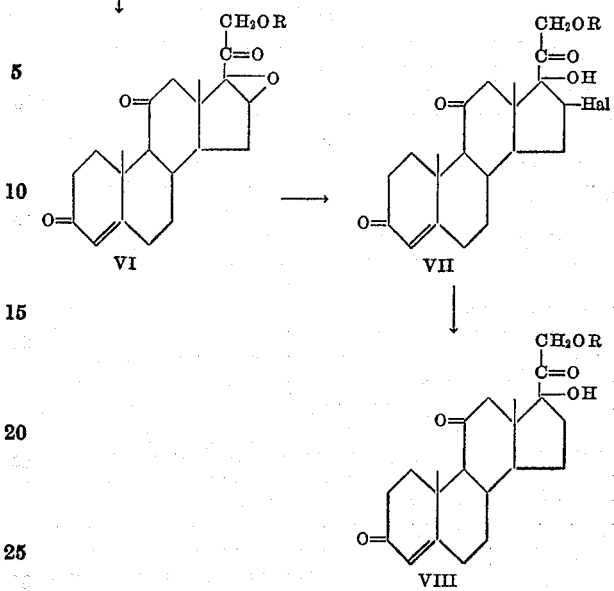

The first step in the process as afore schematically outlined is the oxidation of 3,11-diketo-17-formyl-Δ⁴,¹⁶-androstadiene (Compound I) to the 16,17-oxido derivative (Compound II) employing approximately one chemical equivalent of an oxygen-furnishing agent such as the organic peracids or hydrogen peroxide. The oxidation is ordinarily carried out by mixing the oxidant and 3,11-diketo-17-formyl-Δ⁴,¹⁶-androstadiene together in an organic medium which is non-reactive under the reaction conditions. Suitable media include chloroform, carbon tetrachloride, diethyl ether, glacial acetic acid, methanol, ethanol, isopropanol, and the like. The temperature of the reaction may vary from —10° C. to 50° C. A convenient reaction medium when the oxidant is hydrogen peroxide is a low molecular weight alcohol.

As illustrative of this step is the following:

EXAMPLE I

To a suitable reaction vessel containing 200 parts by weight (substantially 0.64 mol) of dl-3,11-diketo-17-formyl-Δ⁴,¹⁶-androstadiene dissolved in 2400 parts by weight of methanol maintained at a temperature of about 5–10° C. is added approximately 50 parts by weight of 2.65 N sodium hydroxide followed by approximately 580 parts by weight of a methanol-hydrogen peroxide mix containing approximately 22.85 parts by weight of hydrogen peroxide. The mix so obtained is agitated for about 15 hours at 0–5° C. Thereupon substantially all of the methanol is removed by vacuum distillation and the residue is taken up with chloroform. The chloroform solution is washed with water and then dried over anhydrous magnesium sulfate. Upon evaporation of the chloroform there is obtained approximately 212 parts by weight of a white crystalline material, which upon triturating with diethyl ether containing a small amount of chloroform yields white crystalline dl-3,11-diketo-16,17-oxido-17-formyl-Δ⁴-androstene (M. P. 243–245° C.).

Similarly the individual optically active isomers such as the natural modification of 3,11-diketo-16,17-oxido-17-formyl-Δ⁴-androstene are obtained beginning with the individual optically active isomers of 3,11-diketo-17-formyl-Δ⁴,¹⁶-androstadiene.

The next step in the process as afore schematically outlined is the oxidation of the 17-formyl group of the 16,17-oxido compound (Compound II) to form 3,11-diketo-16,17-oxido-Δ⁴-etiocholenic acid (Compound III).

This step is readily brought about employing a mild oxidizing agent such as silver oxide, sodium dichromate in acetic acid, etc.

As illustrative of the preparation of 3,11-diketo-16,17-oxido-Δ⁴-etiocholenic acid is the following:

EXAMPLE II

To an intimate mixture containing approximately 570 parts by weight of dioxane, approximately 570 parts by weight of 10% sodium hydroxide and approximately 63.9 parts by weight of silver nitrate is slowly added approximately 60 parts by weight of dl-3,11-diketo-16,17-oxido-17-formyl-Δ⁴-androstene. Upon completion of the addition of the 16,17-oxido compound approximately 500 parts by weight of water and approximately 500 parts by weight of dioxane is added with constant agitation. Thereafter the mix is agitated for about 1 hour at room temperature. The mix is filtered. The collected residue is washed with water and the washings combined with the original filtrate, which combination is then extracted with several portions of diethyl ether. The ether extracts are discarded. The aqueous layer is then acidified and then extracted with chloroform. The chloroform extracts are combined, dried, and subjected to vacuum distillation. Approximately 57 parts by weight of a yellow crystalline solid is obtained, from which upon triturating with a mixture of diethyl ether and ethyl acetate there is obtained crystalline dl-3,11-diketo-16,17-oxido-Δ⁴-etiocholenic acid (M. P. 217–220° C. with decomposition).

In a similar manner the individual optically active isomers such as the natural modification of 3,11-diketo-16,17-oxido-Δ⁴-etiocholenic acid are obtained beginning with the individual optically active isomers of 3,11-diketo-16,17-oxido-17-formyl-Δ⁴-androstene.

In the next step of the process as afore schematically outlined the acid halide (Compound IV) of 3,11-diketo-16,17-oxido-Δ⁴-etiocholenic acid is prepared employing an acyl halide forming agent such as oxalyl chloride and the like.

As illustrative of this step is the following:

EXAMPLE III

To a solution containing approximately 100 parts by weight of dl-3,11-diketo-16,17-oxido-⁴-etiocholenic acid in approximately 8000 parts by weight of anhydrous methanol is added sufficient sodium methylate to neutralize the epoxy acid. The methanol is removed by vacuum distillation and to the residue is added and intimately mixed approximately 900 parts by weight of benzene and approximately 5 parts by weight of pyridine followed by approximately 500 parts by weight of oxalyl chloride while maintaining the temperature at about 10° C. The mix so obtained is allowed to stand for about 30 minutes, whereupon the mix is subjected to vacuum distillation while maintaining the temperature at about 15° C. The residue is then taken up with approximately 1000 parts by weight of benzene and again subjected to vacuum distillation at about 15° C. The residue is then taken up with approximately 500 parts by weight of benzene and filtered. The filtrate is then subjected to vacuum distillation. A crystalline residue, approximately 87 parts by weight, identified as the acid chloride of dl-3,11-diketo-16,17-oxido-Δ⁴-etiocholenic acid (M. P. 222–224° C.), is obtained.

Similarly the individual optically active isomers such as the acid chloride of the natural modification of 3,11-diketo-16,17-oxido-Δ⁴-etiocholenic acid is obtained beginning with the individual optically active isomers of 3,11-diketo-16,17-oxido-Δ⁴-etiocholenic acid.

The next step of the process as afore schematically outlined is the preparation of the diazo-ketone (Compound V), namely 3,11,20-triketo-16,17-oxido-21-diazo-Δ⁴-pregnene, from the acid halide of 3,11-diketo-16,17-oxido-Δ⁴-etiocholenic acid. This process employs an excess of two chemical equivalents of diazomethane in converting the acid halide (Compound IV) to the desired diazo-ketone (Compound V) and is ordinarily carried out in an inert organic solvent such as ether, benzene, dioxane, toluene, and the like, and at a temperature in the range of —20 to 40° C.

As illustrative of the preparation of the diazo-ketone is the following:

EXAMPLE IV

To a suitable reaction vessel containing an ether solution containing approximately 100 parts by weight of diazomethane is added approximately 50 parts by weight of the acid chloride of dl-3,11-diketo-16,17-oxido-Δ⁴-etiocholenic acid dissolved in 500 parts by weight of benzene while maintaining the temperature at about 0° C. The mixture so obtained is then agitated for about one hour at about 0° C. The mix is then subjected to vacuum distillation whereby a light yellow crystalline residue, melting with decomposition at about 190° C., identified as dl-3,11,20-triketo-16,17-oxido-21-diazo-Δ⁴-pregnene is obtained.

Similarly the optically active isomers such as the natural modification of 3,11,20-triketo-16,17-oxido-21-diazo-Δ⁴-pregnene are obtained beginning with the acid halide of the appropriate individual optically active isomers of 3,11-diketo-16,17-oxido-Δ⁴-etiocholenic acid.

In the next step of the process as afore schematically outlined the diazo-ketone (Compound V) is decomposed by heating in the presence of a carboxylic acid, whereby there is obtained 3,11,20-triketo-16,17-oxido-21-acyloxy-Δ⁴-pregnene

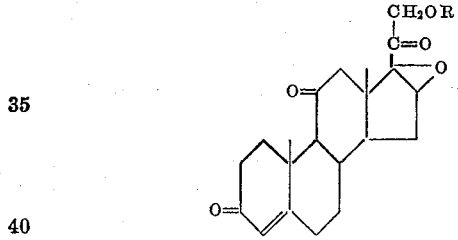

where R is an acyl radical obtained from a carboxylic acid such as acetic acid, propionic acid, butyric acid, valeric acid, caproic acid, lauric acid, stearic acid, phenylacetic acid, β-phenyl propionic acid, benzoic acid, toluic acid, etc., upon removal of the hydroxy group of the carboxyl group. Where desirable an inert organic solvent may be employed such as benzene, toluene, xylene, dioxane.

As illustrative of this step is the following:

EXAMPLE V

To a suitable reaction vessel containing approximately 500 parts by weight of acetic acid is added approximately 5 parts by weight of dl-3,11,20-triketo-16,17-oxido-21-diazo-Δ⁴-pregnene and the mix so obtained heated at about 90–95° C. for about 30 minutes. The mix is then subjected to vacuum distillation. The resultant residue is then taken up with chloroform. The solution is then washed with aqueous sodium bicarbonate, then with water and dried. The chloroform solution so treated is then subjected to vacuum distillation to remove the solvent. The non-crystalline residue so obtained is identified as dl-3,11,20-triketo-16,17-oxido-21-acetyloxy-Δ⁴-pregnene.

Similarly the individual optically active isomers such as the natural modification of 3,11,20-triketo-16,17-oxido-21-acetyloxy-Δ⁴-pregnene are obtained beginning with the individual isomers of 3,11,20-triketo-16,17-oxido-21-diazo-Δ⁴-pregnene.

In the next step of the process as afore schematically outlined the 21-acyloxy compound (Compound VI) is reacted with a hydrogen halide such as HCl, HBr or HI, to remove the epoxide grouping and provide the halo-hydrin (Compound VII), namely 3,11,20-triketo-16-halo-17-hydroxy-21-acyloxy-Δ⁴-pregnene. This reaction is carried out in an inert organic solvent containing dissolved therein a hydrogen halide and at a temperature in the range of —20° C. to 40° C.

As illustrative of this step employing hydrogen bromide is the following:

EXAMPLE VI

Approximately 4 parts by weight of dl-3,11,20-triketo-16,17-oxido-21-acetyloxy-$\Delta^4$-pregnene is admixed with approximately 300 parts by weight of acetic acid and approximately 100 parts by weight of benzene in a suitable reaction vessel. Thereto is added while maintaining the temperature at about 0° C. approximately 8 parts by weight of a 38% acetic acid solution of hydrogen bromide and the mix so obtained agitated for about 30 minutes at 0° C. To the mix is then added an equal volume of water and the composite so obtained extracted with chloroform. The chloroform extracts are combined, washed with water and dried over magnesium sulfate. Upon subjecting the dried chloroform solution to vacuum distillation there is obtained 3.9 parts by weight of a crystalline residue which upon triturating with diethyl ether containing a small amount of acetone yields dl-3,11,20-triketo-16-bromo-17-hydroxy-21-acetyloxy-$\Delta^4$-pregnene (M. P. 238–240° C. with decomposition).

Similarly the individual optically active isomers such as the natural modification of 3,11,20-triketo-16-halo-17-hydroxy-21-acyloxy-$\Delta^4$-pregnene are obtained beginning with the appropriate individual optically active isomers of 3,11,20-triketo-16,17-oxido-21-acyloxy-$\Delta^4$-pregnene.

In the next step of the process as afore schematically outlined the halo-hydrin (Compound VII) is converted to the 21-acyl derivative of 3,11,20-triketo-17,21-dihydroxy-$\Delta^4$-pregnene (Compound VIII) by de-halogenating or reducing the former with a metallic reducing agent such as cobalt, zinc, nickel, etc.

As illustrative of this step is the following:

EXAMPLE VII

To a suitable reaction vessel containing 10 parts by weight of Raney nickel is added and intimately mixed 25 parts by weight of water and 2 parts by weight of dl-3,11,20-triketo-16-bromo-17-hydroxy-21-acetyloxy-$\Delta^4$-pregnene and the reaction mix so obtained refluxed in an atmosphere of nitrogen for about 4 hours. The reaction mix so obtained is filtered and the residue washed with warm acetone. The washings and original filtrate are combined and subjected to vacuum distillation. The resultant residue is taken up with chloroform and the solution so formed washed with water and dried. The dried solution is then subjected to vacuum distillation whereupon there is recovered approximately 1.9 parts by weight of a white crystalline residue which upon triturating with diethyl ether-acetone mix yields dl-3,11,20-triketo-17-hydroxy-21-acetyloxy-$\Delta^4$-pregnene (M. P. 240–243° C.) which compound is identical with the acetate of racemic (dl) cortisone.

Similarly the individual optically active isomers such as acyl derivatives of the natural modification of 3,11,20-triketo-17,21-dihydroxy-$\Delta^4$-pregnene are obtained beginning with the appropriate optically active isomers of 3,11,20-triketo-16-bromo-17-hydroxy-21-acyloxy-$\Delta^4$-pregnene. The 21-acyl derivative of the natural modification of 3,11,20-triketo-17,21-dihydroxy-$\Delta^4$-pregnene according to infrared spectrum, melting point and optical rotation is identical with the corresponding acyl derivative of natural cortisone. Thusly it is to be understood that the optically active isomers referred to herein as the "natural modification" are those which through the course of reactions as afore schematially outlined provide for the acyl derivatives of natural cortisone.

The 17-formyl-cyclopent-16-eno-10,13-dimethyl-$\Delta^4$-dodecahydrophenanthren-3,11-diones (Compound I of the schematic diagram) are new compounds and as illustrative of their preparation but particularly the natural modification of 3,11-diketo-17-formyl-$\Delta^{4,16}$-androstadiene is the following:

The process initially comprises (as described by W. S. Knowles, in United States application Ser. No. 345,699, filed March 30, 1953) the preparation of the natural modification of 3-keto-16,17-dihydroxy-$\Delta^{4,9(11)}$-D-homoandrostadiene by a process comprising (a) reacting the levo-rotatory form of anti-trans-1,8a-dimethyl, $\Delta^{6,10a(1)}$-decahydrophenanthren-2-one with ethyl formate in the presence of sodium methylate to form the 1,8a-dimethyl-3-[(hydroxy) methylene], $\Delta^{6,10a(1)}$-decahydrophenanthren-2-one derivative, (b) condensing 1,8a-dimethyl-3-[(hydroxy) methylene], $\Delta^{6,10a(1)}$-decahydrophenanthren-2-one derivative with N-methylaniline to form the 1,8a-dimethyl-3-[(N-methylanilino) methylene], $\Delta^{6,10a(1)}$-decahydrophenanthren-2-one derivative, (c) reacting the1,8a-dimethyl-3-[(N-methylanilino) methylene], $\Delta^{6,10a(1)}$-decahydrophenanthren-2-one derivative with acrylonitrile under alkaline conditions and converting the product so obtained by vigorous alkaline hydrolysis to the corresponding 1,8a-dimethyl-1-($\beta$-carboxyethyl), $\Delta^{6,10}$-decahydrophenanthren-2-one compound, (d) heating the 1,8a-dimethyl-1-($\beta$-carboxyethyl), $\Delta^{6,10}$-decahydrophenanthren-2-one compound with acetic anhydride in the presence of sodium acetate to form the 3-keto-$\Delta^{5,9(11),16}$-4-oxa-D-homoandrostatriene derivative, (e) reacting the 3-keto-$\Delta^{5,9(11),16}$-4-oxa-D-homoandrostatriene derivative with a methyl magnesium halide in the presence of ether, decomposing the addition product so obtained by acidification with mineral acid, (f) treating the ether solubles of the acidified mix with an alkali metal hydroxide and recovering therefrom the corresponding 3-keto-$\Delta^{4,9(11),16}$-D-homoandrostatriene derivative, (g) oxidizing the 3-keto-$\Delta^{4,9(11),16}$-D-homoandrostatriene derivative so formed with iodine in the presence of silver acetate, (h) hydrolyzing the product so obtained to form the corresponding natural modification of 3-keto-16,17-dihydroxy-$\Delta^{4,9(11)}$-D-homoandrostadiene. The acetonide of the natural modification of 3-keto-16,17-dihydroxy-$\Delta^{4,9(11)}$-D-homoandrostadiene is then prepared by reacting the glycol with acetone in the presence of anhydrous copper sulfate. The acetonide is then converted to the natural modification of 3,11-diketo-17-formyl-$\Delta^{4,16}$-androstadiene by the process as described by W. S. Knowles in United States application Ser. No. 355,399, filed May 15, 1953, which process comprises (a) reacting 3-keto-16,17-dihydroxy-$\Delta^{4,9(11)}$-D-homoandrostadiene acetonide with hypomobromous acid, (b) oxidizing the 9-bromo-11-hydroxy addition product so obtained in an anhydrous medium with a complex of chromium oxide and pyridine, (c) admixing the oxidized product so obtained with zinc and acetic acid to effect formation of 3,11-diketo-16,17-dihydroxy-$\Delta^4$-D-homoandrostene acetonide, (d) hydrolyzing the acetonide so obtained to form the free glycol with dilute mineral acid, (e) oxidizing the glycol so obtained with periodic acid, (f) heating the oxidized product so obtained in the presence of piperidine acetate, (g) and recovering the natural modification of 3,11-diketo-17-formyl-$\Delta^{4,16}$-androstadiene.

While this invention has been described with respect to certain embodiments it is not so limited and it is to be understood that modifications and variations obvious to those skilled in the art may be made without departing from the spirit or scope of this invention.

This application is a division of our copending application Serial No. 361,828, filed June 15, 1953.

Addendum

The compound of column 6, lines 8–9, namely the levo rotatory form of anti-trans-1,8a-dimethyl, $\Delta^{6,10a(1)}$-decahydrophenanthren-2-one, is prepared by the addition of one molecule of hydrogen to the 9–10 double bond of the levo-rotatory form of anti-trans-1,8a-dimethyl, $\Delta^{6,9,10a(1)}$-decahydrophenanthren-2-one employing palladium as the hydrogenation catalyst.

What is claimed is:

1. A 17-formyl-cyclopentano-16,17-oxido-10,13-dimethyl-$\Delta^4$-dodecahydrophenanthren-3,11-dione of the structural formula

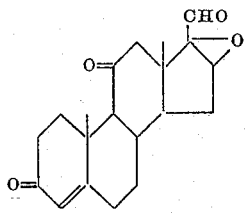

2. The method of making the compound of claim 1 which comprises oxidizing 3,11-diketo-17-formyl-$\Delta^{4,16}$-androstadiene with substantially one chemical equivalent of hydrogen peroxide at a temperature in the range of $-10°$ C. to $50°$ C.

No references cited.